United States Patent
Patsalos

(10) Patent No.: US 7,011,038 B2
(45) Date of Patent: Mar. 14, 2006

(54) HYGIENIC AND ERGONOMIC BREADING MACHINE

(76) Inventor: Louis Patsalos, 625 N. Briarwood Ave., West Islip, NY (US) 11795

( * ) Notice: Subject to any disclaimer, the term of this patent is extended or adjusted under 35 U.S.C. 154(b) by 301 days.

(21) Appl. No.: 10/701,876

(22) Filed: Nov. 5, 2003

(65) Prior Publication Data

US 2004/0123746 A1    Jul. 1, 2004

Related U.S. Application Data

(60) Provisional application No. 60/436,801, filed on Dec. 27, 2002.

(51) Int. Cl.
*B05C 19/06* (2006.01)

(52) U.S. Cl. .......... 118/13; 118/19; 118/308; 118/412; 118/418; 118/423; 99/494

(58) Field of Classification Search .......... 118/13, 118/19, 308, 412, 417, 418, 423; 426/293, 426/295, 296; 99/494; 366/255, 256; 427/202; 134/61, 78, 135; 206/541, 546; 220/4.26, 220/4.27, 485

See application file for complete search history.

(56) References Cited

U.S. PATENT DOCUMENTS

| 895,856 | A | 8/1908 | Harton | 118/13 |
|---|---|---|---|---|
| 1,819,557 | A | 8/1931 | Hunter | |
| 2,855,893 | A | 10/1958 | Greer | 118/16 |
| 2,871,867 | A * | 2/1959 | Lanzetter | 134/58 R |
| 3,520,277 | A | 7/1970 | Gordon | 118/23 |
| 3,547,075 | A | 12/1970 | Johnson | 118/16 |
| 3,589,274 | A | 6/1971 | Murray | 99/349 |
| 3,735,726 | A | 5/1973 | Butler | 118/24 |
| 3,739,943 | A | 6/1973 | McKee | 118/19 |
| 3,885,519 | A | 5/1975 | Orlowski | 118/16 |
| 3,955,529 | A | 5/1976 | Reed | 118/19 |
| 3,967,583 | A | 7/1976 | Booth | 118/16 |
| 4,196,231 | A * | 4/1980 | Hubers | 427/240 |
| 4,198,166 | A | 4/1980 | Tuns | 366/122 |
| 4,210,074 | A | 7/1980 | Laughman | 99/494 |
| 4,385,420 | A | 5/1983 | Shelton | 17/26 |
| 4,458,586 | A | 7/1984 | Reed | 99/494 |
| 4,497,244 | A | 2/1985 | Koppens | 99/494 |
| 4,808,424 | A | 2/1989 | Wadell | 426/289 |
| 5,020,427 | A | 6/1991 | Kennefick | 99/494 |
| 5,052,330 | A | 10/1991 | Stacy | 118/16 |
| 5,226,354 | A | 7/1993 | Stewart | 99/494 |
| 5,236,502 | A | 8/1993 | Wadell | 118/24 |
| 5,238,493 | A | 8/1993 | Miller | 118/16 |
| 5,284,514 | A | 2/1994 | Griffiths | 118/23 |

(Continued)

OTHER PUBLICATIONS

Henny Penny "Broading Systems"Henny Penny Global Food Service Solutions, Baton, Ohio, 2 page advertisement, ©2002.

(Continued)

*Primary Examiner*—Laura Edwards
(74) *Attorney, Agent, or Firm*—Alfred M. Walker

(57) ABSTRACT

A food breading machine includes a lowerable cage carrier grate of two grids between which the cutlet resides. The cage supports a meat, fish or vegetable cutlet thereon, which descends into a first basin having a bath of raw egg fluid. The egg saturated product is then lifted and horizontally rotated in a plane to an adjacent basin having bread crumbs. The device can have a manually rotatable knob at the top to control flipping, or it can be automated. A protective transparent domed hood is also included. The parts are disassembled so that they can be washed.

4 Claims, 5 Drawing Sheets

U.S. PATENT DOCUMENTS

| | | | |
|---|---|---|---|
| 5,463,938 A | 11/1995 | Sarukawa | 99/352 |
| 5,643,361 A | 7/1997 | Wadell | 118/16 |
| 5,664,489 A | 9/1997 | Herrick | 99/494 |
| 5,733,184 A | 3/1998 | Curry et al. | 452/138 |
| 5,924,356 A | 7/1999 | Harper | 99/494 |
| 5,937,744 A | 8/1999 | Nothum, Sr. et al. | 99/494 |
| 5,939,116 A | 8/1999 | Ono | 426/242 |
| 6,000,320 A | 12/1999 | Herrick | 99/494 |
| 6,214,403 B1 | 4/2001 | Broberg | 426/549 |
| 6,238,281 B1 | 5/2001 | Gagliardi | 452/135 |
| 6,244,170 B1 | 6/2001 | Whited | 99/494 |
| 6,257,132 B1 | 7/2001 | Bifulco | 100/161 |
| 6,269,739 B1 | 8/2001 | Bettcher | 99/494 |
| 6,305,274 B1 | 10/2001 | Nothum, Sr. et al. | 99/404 |
| 6,505,547 B1 | 1/2003 | Burnett | 99/494 |
| 6,513,450 B1 | 2/2003 | Gore | 118/13 |
| 6,591,777 B1 | 7/2003 | Cameron | 118/13 |
| 2003/0079678 A1 | 5/2003 | Zeegers et al. | 118/16 |
| 2003/0097939 A1 | 5/2003 | Ruibrugent | 99/349 |
| 2004/0018281 A1 | 1/2004 | Dowd | 426/296 |
| 2004/0020375 A1 | 2/2004 | Holmes | 99/494 |

OTHER PUBLICATIONS

"Nilma Bread 2000 Continuous Breading Machine", www.Hilma.com, 3 page website, 2004.

"Automatic Batter—Breading Machine", Bettcher Industries, Inc., www.bettcher.com, general product information, 2 page website, 2004.

"Automatic Batter—Breading Machine", Bettcher Industries, Inc., www.bettcher.com, technical information, 4 page website, 2004.

* cited by examiner

HYGIENIC AND ERGONOMIC BREADING MACHINE

This application claims benefit of U.S. Provisional application 60/436,801 filed Dec. 27, 2002.

FIELD OF THE INVENTION

The present invention relates to hygienic and ergonomic breading food breading machines.

BACKGROUND OF THE INVENTION

Breaded food products such as meat cutlets or fish fillets are traditionally done manually by cutting the cutlets or fillets, then manually dipping them sequentially into separate pans of egg mixture and breaded granular particles. However, this is a tedious and arduous process.

On the other hand, in industry, complicated conveyor feed mechanisms introduce cutlets or fillets into dipping compartments on a scale that is impractical for household kitchen use.

Among related United States patents for industrial food breading machines include the following:

I U.S. Patents

| U.S. Pat. Nos. | Date | Inventor | Class Sub Class |
|---|---|---|---|
| 895,856 | Aug. 11, 1908 | Harton | |
| 1,819,557 | Aug. 18, 1931 | H. T. Hunter | |
| 2,855,893 | Oct. 14, 1958 | F. W. Greer et al | |
| 3,547,075 | Dec. 15, 1970 | Johnson Sandusky | 118/16 |
| 3,589,274 | Jun. 29, 1971 | Murray | 99/349 |
| 3,735,726 | May 29, 1973 | Butler | 118/24 |
| 3,739,743 | Jun. 19, 1973 | McKee Jr. | 118/19 |
| 3,885,519 | May 27, 1975 | Orlowski | 118/16 |
| 3,955,529 | May 11, 1976 | Reed | 118/19 |
| 3,967,583 | Jul. 06, 1976 | Booth | 118/16 |
| 4,385,420 | May 31, 1983 | Shelton | 17/26 |
| 4,497,244 | Feb. 05, 1985 | Koppens | 99/494 |
| 4,808,424 | Feb. 28, 1989 | Wadell | 426/289 |
| 5,020,427 | Jun. 04, 1991 | Kennefick et al. | 99/494 |
| 5,052,330 | Oct. 01, 1991 | Stacy | 118/16 |
| 5,226,354 | Jul. 13, 1993 | Stewart | 99/494 |
| 5,236,502 | Aug. 17, 1993 | Wadell | 118/24 |
| 5,284,514 | Feb. 08, 1994 | Griffiths | 118/23 |
| 5,463,938 | Nov. 07, 1995 | Sarukawa et al. | 99/352 |
| 5,643,361 | Jul. 01, 1997 | Wadell | 118/16 |
| 5,664,489 | Sep. 09, 1997 | Herrick, IV | 99/494 |
| 5,924,356 | Jul. 20, 1999 | Harper et al. | 99/494 |
| 5,939,116 | Aug. 17, 1999 | Ono | 426/242 |
| 6,000,320 | Dec. 14, 1999 | Herrick, IV | 99/494 |
| 6,214,403 B1 | Apr. 10, 2001 | Broberg et al. | 426/549 |
| 6,238,281 B1 | May 29, 2001 | Gagliardi, Jr. | 452/135 |
| 6,244,170 B1 | Jun. 12, 2001 | Whited et al. | 99/494 |
| 6,269,739 B1 | Aug. 07, 2001 | Bettcher et al. | 99/494 |
| 6,505,547 B1 | Jan. 14, 2003 | Burnett | 99/494 |
| 6,513,450 B1 | Feb. 04, 2003 | Gore | 118/13 |

However, the aforementioned patents do not describe a domestic kitchen counter food breading machine for breading food products, such as cutlets, which includes a lowerable cage carrier grate of two grids, between which the cutlet resides, wherein the grate descends into a first basin having a bath of raw egg fluid, rotates and repeats that dipping process and wherein the egg saturated product is then lifted and horizontally rotated in a plane (parallel the plane of the table) to an adjacent basin having bread crumbs, wherein the food product within the grate is also dipped twice, to cover both sides of the cutlet with both egg product and breaded particulates. The prior art patents also do not describe a kitchen countertop food breading machine having a protective transparent domed hood. The prior art patents also do not describe a food breading machine wherein the parts are disassembled so that they can be individually washed and sanitized.

OBJECTS OF THE INVENTION

It is therefore an object of the invention to provide a breading machine which is inexpensive to manufacture, easy to use, and easy to clean effectively for domestic kitchen use.

Yet another object of the invention is to provide a breading machine which includes component parts which are efficient to ship, convenient to store, and sized to fit a sink and dishwasher.

Another object of the present invention is to eliminate the mess on a table or a countertop usually associated with the breading task.

Also an object of this invention is a breading machine which can be quickly assembled or knocked down into component parts.

A further object of this invention is to provide an ergonomic food breading machine.

Another object of this invention is to retard the growth of harmful bacteria such as salmonella in food breading operations in the domestic kitchen.

SUMMARY OF THE INVENTION

In keeping with these objects and others which may become apparent, the present invention is a table-top breading machine for coating a variety of food items with suitable breading granules which are adhered to a food item by an egg mixture or the like.

The breading machine coats a food product with a mixture of food particulate, such as bread or flour and a food liquid, such as egg fluid.

It includes a transparent cover, preferably a dome or other suitable geometric shape, enclosing a pair of trays mounted side by side. One of the trays contains the food liquid, such as eggs and one of said trays contains the food particulates, such as bread crumbs or flour particles.

A slidable and rotatable vertical middle armature member supports a carrier grate, which passes between the trays, between a resting position prior to use and a lowered position during use.

The carrier grate extends from, and is mounted on, one side of the vertical armature member. Before use, the carrier grate is located in a resting position above the two trays. The carrier grate is rotated axially in a horizontal plane, between a first position, where the carrier grate is above one of the trays, and a second position where the carrier grate is above the second of the trays.

The carrier grate supports a solid food product to be breaded with a mixture of the food liquid, such as eggs, and the food particulates, such as bread crumbs or flour particles.

The vertical member may be depressed and retracted, thereby causing the carrier grate, having the solid food product mounted therein, to dip the solid food product, such as a veal cutlet or fish fillet, into one of the trays to be coated by the food liquid tray. The vertical middle armature member rotates vertically in an axial direction, to place the carrier grate above the other of the trays. This allows the carrier grate to be lowered into the other bread crumb or flour tray, to coat the food product with the food particulates.

In addition, the vertical middle armature member has a sub-component to flip and rotate the carrier grate 180 degrees, about a horizontal axis, to allow another side of the food product to be coated in turn with the food liquid tray and the food particulate tray.

For example, the carrier grate may be rotated by a second member which is attached to the vertically rotatable member and which is in communication with a shaft to the carrier grate, whereby the rotation of the shaft by the second member causes rotation of the carrier grate about a horizontal axis.

While other configurations may apply, in one embodiment, the rotating vertical middle armature member may be an upstanding tube, which extends up out of the transparent cover through an opening, with a rotatable handle at an upper end also having a push button thereon, which is connected to a mechanism to convert linear movement to rotational movement, such as a gear rack. This causes the carrier grate (with the food product inside) to flip upside down, so that both sides of the food product can be coated in either tray.

The middle armature of the breading machine may have such a movable gear rack within the outer tube to rotate the grate. In such a case, an elongated slot is provided in the outer tube, with an edge of the slot being formed into the gear rack. An inner tube is slidable within the outer tube, and the inner tube has a shaft extending out through the slot of the outer tube. An end of the shaft outside of the middle armature is attached to the carrier grate and another end of the shaft is within the outer tube, and in one embodiment has a pinion engaged with the gear rack, so that sliding of the inner tube within the outer tube causes the shaft and grate to rotate 180 degrees.

In operation, a food product is coated and breaded with a mixture of the food liquid and the food particulates. First, the food liquid and the food particulates are placed separately into a pair of the trays, respectively, which are mounted side by side. The user engages the slidable and rotatable vertical member between the two trays. The grate extends from, and is mounted on, one side of the vertical member, and the carrier is located above one of the trays. Next, a food product is attached on the carrier grate, and coated with a mixture of the food liquid and the food particulates. The vertical middle armature member is pushed downwardly until the carrier grate and the food product therein contact either the food liquid such as eggs, or the food particulate such as bread crumbs or flour, within one of the two trays.

The carrier grate is first rotated about a horizontal axis to be dipped on both sides.

Then, the carrier grate is rotated about a vertical axis until the grate is above the other tray.

In one embodiment, the tubular vertical member is pushed downwardly until the carrier grate and the food product contacts the other tray with the food particulate. The vertical member is retracted up.

After the food product is both coated with eggs and with bread crumbs or flour, the food product is removed from the carrier grate and is replaced with another food product to be coated.

The food breading machine can be shipped, stored and cleaned with ease. Also, the use of the vertical member for both dipping and flipping the food product eliminates the need for complex mechanisms, and multiple complex hinged doors on covers. These features minimize bacteria-holding nooks and crannies for growth and reduce manufacturing cost. These knock-down features, which can be quickly reassembled, also differentiate the present invention from the prior art.

Concerning materials for the transparent domed cover, while other see-through configurations are foreseeable, in a preferred embodiment, the transparent dome shaped cover is preferably made of either a transparent polycarbonate or an acrylic molding.

For sanitary reasons, the manufacture of the breading machine is of several separate parts, which are easy to ship and to clean. The preferred method of manufacture of the base is by injection molding of a food-grade plastic resin. Judicious partitioning and knockdown interlocks easily and quickly accomplish these operations.

Once the cutlet or fillet is breaded, it can be unloaded from the carrier grate completely unencumbered by the transparent dome. The dome prevents any mess from the ingredients and offers protection from overhead contamination during preparation. The lower base section catches any drips or debris during unloading.

The carrier grate is attached in a swivel fashion to the middle vertical armature for both vertical dipping, 180 degree axial rotation for re-dipping on another side, and 360 degree planar rotation from one side of the dome to the other side.

For commercial use such as in a restaurant or catering kitchen, a somewhat larger version of the breading machine of this invention can be used. However, with extended use, the liquid egg mixture pan is removable for quick cleaning or replacement with a clean one. Eggs often harbor salmonella bacteria, and if kept at room temperature for an extended period could be a source of contamination.

In an alternate embodiment, the operation of flipping or turning over food holder grate is motorized to make the manual operation of the breading machine more streamlined and efficient. In this embodiment, a motorized rotator is provided. A rotator, such as an elastomeric timing belt, can be used to engage a carrier grate rotating gear. The motorized rotator is assembled on a molded chassis of a semi-resilient material, such as, for example, plastic resin, such as nylon, which is dishwasher safe. The drive mechanism may include a housing combining a switch activated motor, such as, for example, a permanent magnet DC gearmotor with a snap-action switch and two short gimbal shafts, which can snap into holes in gimbal brackets. A switch actuator arm turns the motor on when a force is exerted by contact with a pulley on a belt, which rides on smooth crowned drive and idler pulleys. The rotator rotates slightly on gimbal shafts to force a switch actuator. A belt is slipped over the pulleys and the motorized rotator has motor/switch modules prewired via a cable to a wall-mount AC to DC power supply. The rotator gear starts the motor, which moves the belt and flips the carrier grate.

BRIEF DESCRIPTION OF THE DRAWINGS

The present invention can best be understood in conjunction with the drawings, in which.

DETAILED DESCRIPTION OF THE INVENTION

Figure 1:
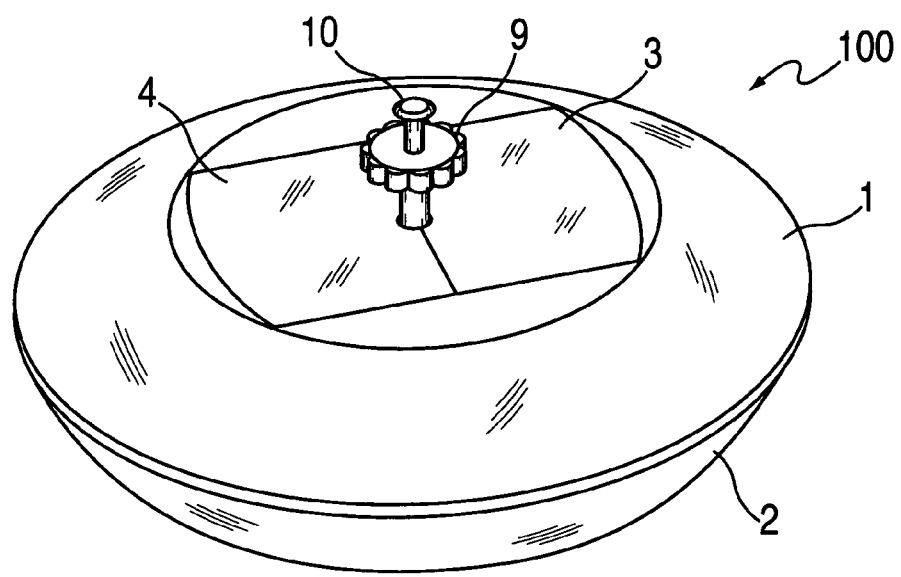
FIG. 1 is a perspective view of one embodiment of the breading machine of this invention.
Figure 2:
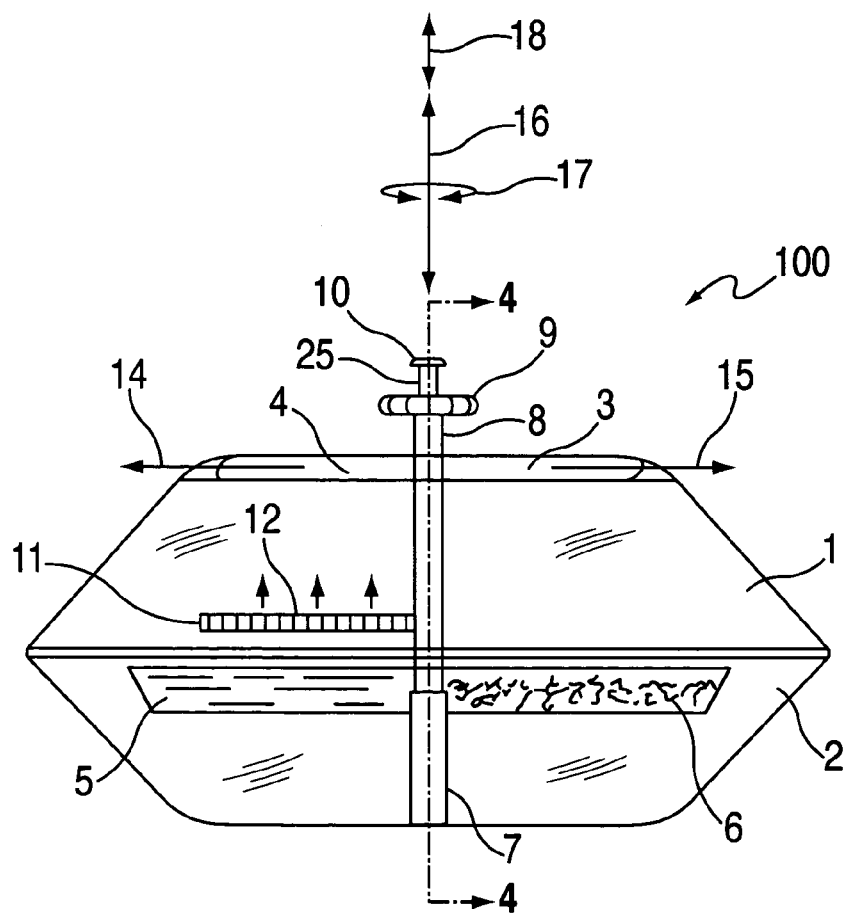
FIG. 2 is a side elevation view of the breading machine of FIG. 1.
Figure 3:
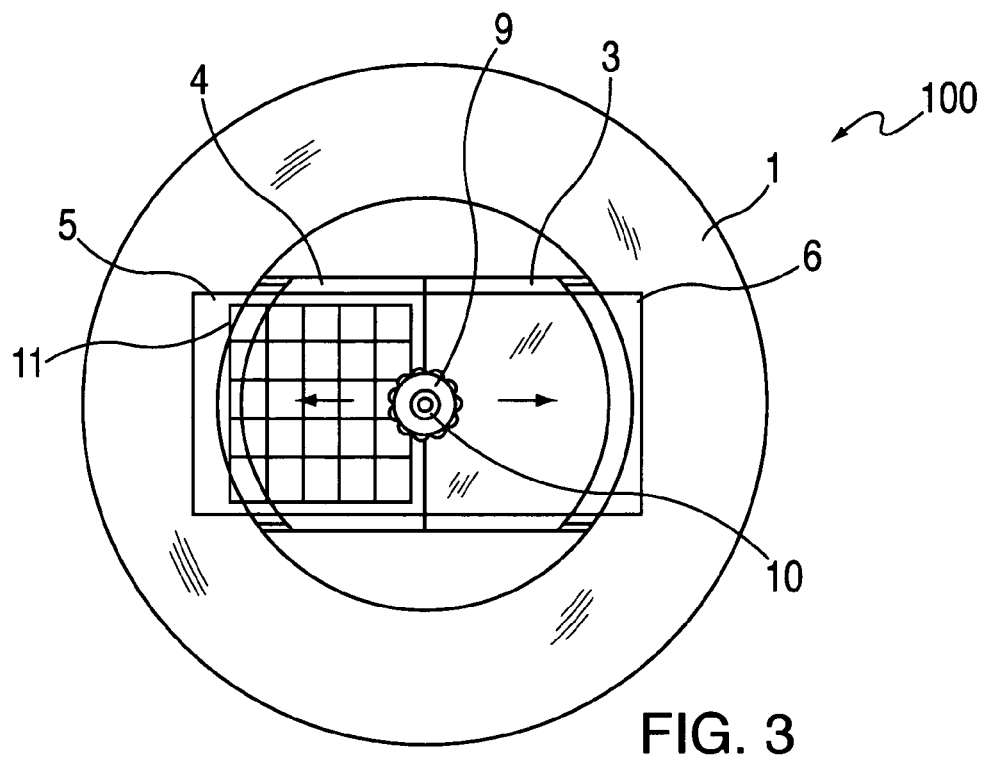
FIG. 3 is a top plan view of the breading machine of FIG. 1.

One embodiment 100 of this breading machine is shown in the perspective view of FIG. 1, as well as the side view of FIG. 2 and the top view of FIG. 3. Breading machine 100 includes molded base shell 2, domed transparent cover 1 with doors, such as sliding doors 3 and 4, egg mixture tray 5, and bread crumb tray 6.

Base shell 2 and domed cover 1, which fits over it, can be molded of the same transparent resin such as acrylic or polycarbonate.

While cover 1 shows a dome with flat sliding doors 3 and 4, it is known that access to the interior may be of other configurations, such as by one or more flat or hinged doors. In addition, the dome itself could be bifurcated in two split parts, such as semi-spherical cover portions 203 and 204, shown in the embodiment of FIGS. 5 and 6. While semi-spherical parts 203 and 204 may be fixedly attached to a base shell, such as base shell 202 or other base shells, they can also be removably attached by other fasteners to a base shell.

Further with respect to FIGS. 1, 2 and 3, mechanism armature 7, preferably tubular, extends vertically upward and is rigidly attached to the center of the base 2. Trays 5 and 6 are attached to armature 7.

A main operating armature 8 fits coaxially within the armature 7 and extends beyond doors 3 and 4, which have semicircular holes at their contact center to accommodate such penetration.

A rigid food carrier grate 11 is pivotally attached to the main operating armature 8 such that it is able to be rotated or "flipped". Knob 9 is used to rotate carrier grate 11 laterally, to align it with either the egg tray 5 or the crumb tray 6. Knob 9 may additionally be used to control the dipping process. Grate 11 has an openable, preferably removable and flexible, grate cover section 12 which is of similar size to grate 11, and which attaches to grate 11 via fasteners, such as, for example integral spring clips (not shown) to hold food items to be breaded of varying thicknesses.

A small knob 10 atop tube 25, which is coaxially within the main operating armature 8, is used for the grate flipping operation.

The operation involves the steps of first filling tray 5 with egg mixture and tray 6 with a bread or flour crumb mixture. Then, the flexible carrier grate cover 12 is opened from a rigid lower section of grate 11, to permit the food to be breaded to be placed upon the carrier grate 11, and then is locked in place by re-attaching the flexible grate 12 over it. The knob 9 is rotated in a direction 17 to place grate 11 squarely over tray 5. Then knob 9 is pressed downward in the direction 16 to dip the grate 11 into the egg mixture.

Both trays 5 and 6 preferably have slots with self-sealing flexible lip seals (not shown) at the center of their proximal vertical sides to permit the grate pivot shaft to travel down beyond the edge of the trays, without spilling contents therefrom.

Upon release of the knob 9, grate 11 rises by a force, such as a spring force from spring 28 within vertical armature 7, and the knob 10 attached to tube 25 is pressed or pulled up in direction 18 a short distance, until grate 11 is flipped 180 degrees.

At this time knob 9 is pressed downward again to dunk the opposite side in the egg mixture. Upon release, the knob 9 is rotated either clockwise or counterclockwise until grate 11 is now over crumb tray 6. Then the dunking and flipping motions as in the egg tray situation are repeated to coat both sides with crumbs. Thereafter the door 3 is slid open in the direction 15 to retrieve the breaded food items. Access to egg tray 5 is achieved by sliding door 4 open in a direction 14.

Figure 4:
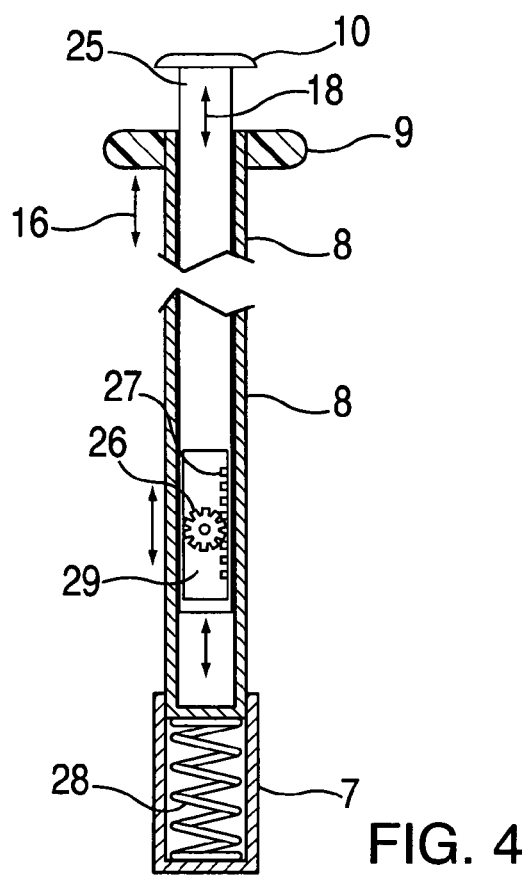
FIG. 4 is a side cross-sectional view of an operating mechanism of the embodiment shown in FIGS. 1, 2 and 3.

The mechanism to achieve these operating steps is revealed in the side cross-section of FIG. 4. The up and down movement of the main operating armature 8 within base armature 7 is mediated by return spring 28 within base armature 7, which impinges upon and supports the sealed bottom of main operating armature 8. Tube 18 (within main operating armature 8) preferably has a cutout 29, with gear rack 27 on one side. This engages pinion gear 26, which is rigidly attached to the support shaft of grate 11. Then as knob 10 is moved up or down relative to knob 9, it is understood that gear 26 will rotate, thereby causing grate 11 to flip over.

Figure 5:
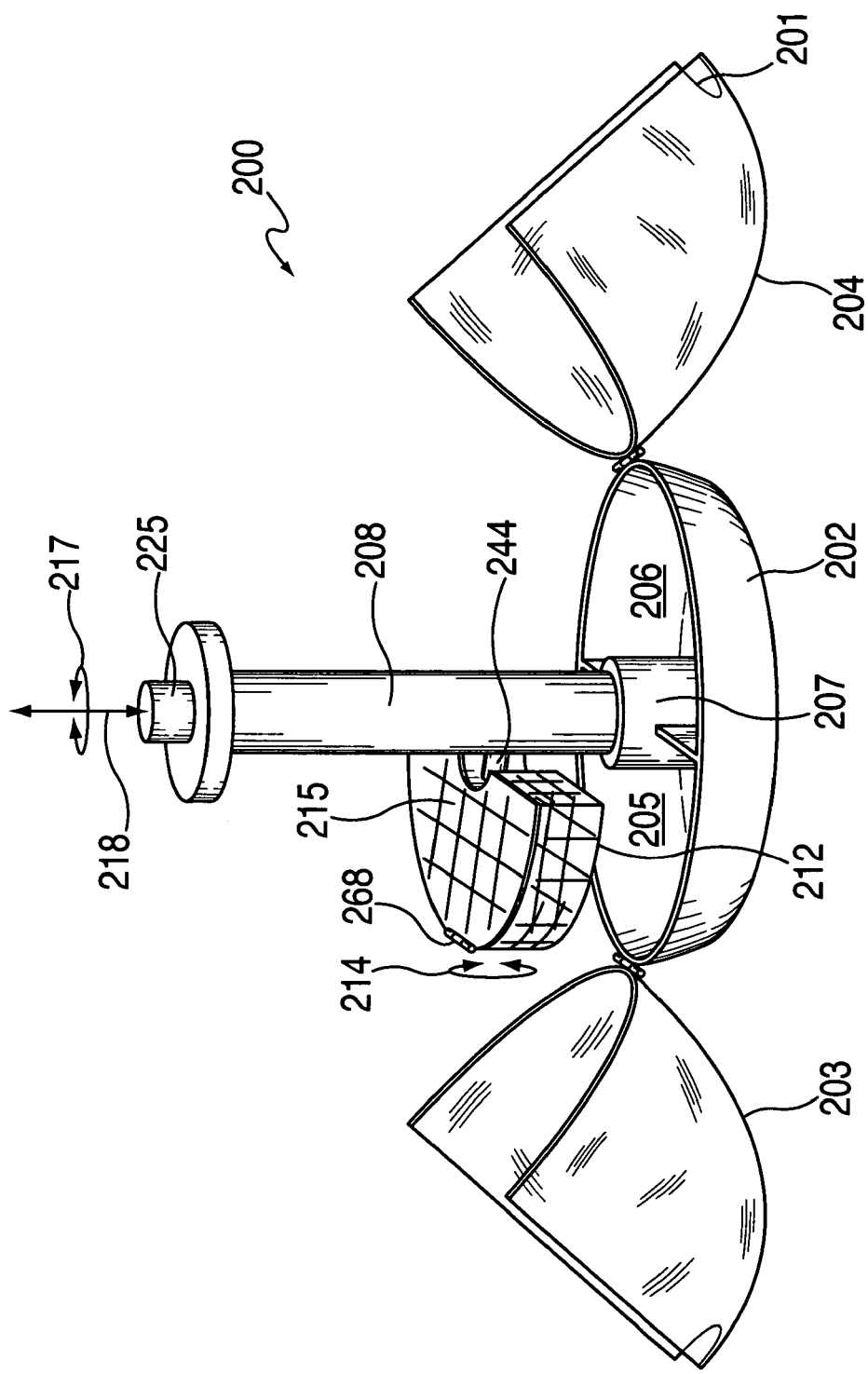
FIG. 5 is a perspective view of an alternate embodiment of a food breading machine.

In FIG. 5, a working perspective drawing illustrates the present invention according to an alternative embodiment of the current invention. Base shell 202 provides an enclosure for the operating mechanisms and prevents baking goods from splattering. A dome formed by domed cover portion 203 and domed cover portion 204 may be of a transparent material as described herein, enclosing the operating mechanisms as to prevent splattering and the possible spread of salmonella and other food related diseases. Domed cover portions 203 and 204 may slide closed, meeting at the centerline of the invention, such that the semi-spherical cutaways 201 allow for the protrusion of the tube 208. The fastening mechanism may comprise hinges or other fasteners, which allow for the removal of the domed cover portions 203 and 204 from base shell 202 for the purpose of conventionally washing.

The domed cover portions 203 and 204 may be attached fixedly or removably to base shell 202. Alternatively, the domed cover may be continuous, such shown as domed cover 2 in FIGS. 1–3, and thus be removable from base shell 2 by simply sliding upward in conjunction with a locking means. Other transparent geometric forms can be used to cover trays 205 and 206.

Figure 6:
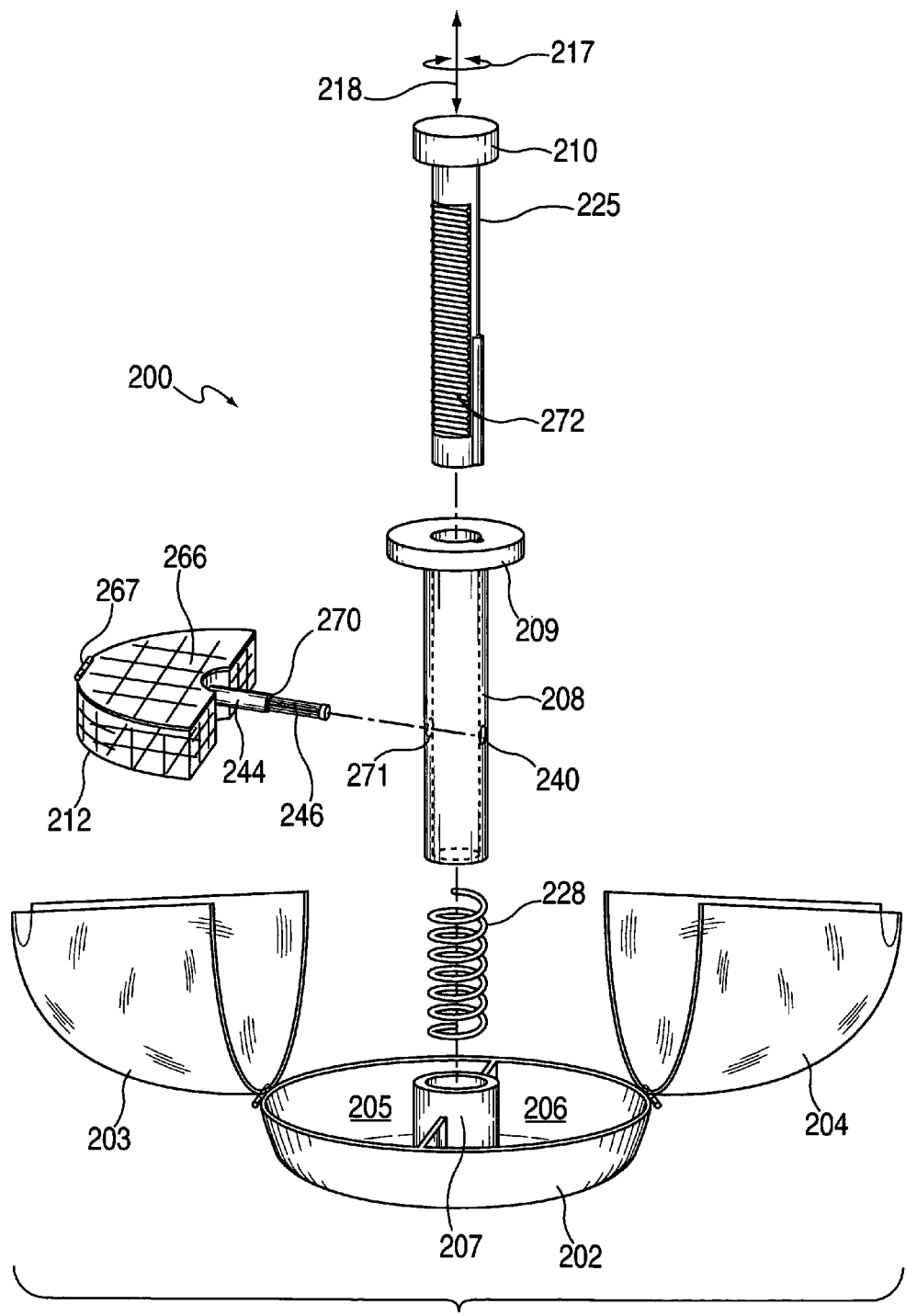
FIG. 6 is a detailed exploded view of the invention according to the embodiment of FIG. 5.

FIG. 6 illustrates a detailed perspective drawing of the alternate embodiment of the current invention. Similar to the preferred embodiment of FIG. 1, FIG. 2 and FIG. 3, the alternate embodiment includes a molded base shell 202, domed transparent cover 201 with domed cover portions 203 and 204 functioning as doors, providing access to egg mixture tray 205 and bread crumb tray 206.

Base shell 202, preferably round in geometry, and domed cover 201, which fits over it, can be molded of the same transparent resin such as acrylic or polycarbonate.

Lower base armature 207, preferably tubular, is rigidly attached to the center of the base shell 202. Trays 205 and 206 may be part of base shell 202, or may be attached to armature 207 by a removable means, such as a tongue and groove combination or simply by corresponding slots or keyholes. A spring 228 is placed in communication with the inside perimeter of the armature 207.

A main operating mid armature tube 208 fits coaxially within the lower base armature 207, and extends beyond dome cover portion doors 203 and 204, which have semicircular cutaways at their contact center to accommodate such penetration. The main operating mid armature tube 208 is free to rotate axially and free to move upwards and downwards upon applied pressure, and against the effective pressure of the spring 228 being in a state of compression. A slit 240 extends horizontally from the side of the tube 208 to a point past the center point of the mid armature tube 208. The slit 240 is tapered, forming a lock-in section for receipt of a horizontally-extending axle 244 supporting open walled food grate 212. Two stops 271 may extend horizontally and opposing from two points on the armature tube 208 below slit 240. The stops 271 act to prevent free rotation. Rigid food carrier support 212 may be removably attached to mid armature tube 208 by insertion of the axle 244 into the slit 240 of mid armature 208 such that the food carrier support 212 is locked in place as to prevent lateral movement, but free to rotate, thus being in rotational communication with mid armature tube 208.

FIG. 6 also shows food carrier 212 and food carrier support axle 244 as in FIG. 5. The axle 244 comprises shaft 270 and a pinion 246 rigidly attached to the shaft 270. The pinion 246 of axle 244 is also in communication with rack 272 of tube 225, to permit rotation of food grate 212.

Knob 209 is used to rotate food carrier 211 horizontally with respect to the mid armature tube 208, to align it with either the egg tray 205 or the crumb tray 206. Food carrier 212 has a removable flexible grate cover section 266 which is of similar size and attaches to food carrier 212 via fasteners 268, such as, for example integral spring clips (not shown) to hold food items to be breaded of varying thickness'.

A small knob 210 atop upper armature tube 225, which is coaxially within mid armature tube 208, is used for the food carrier 212 flipping operation.

The operation involves the steps of first filling egg tray 205 with egg mixture and crumb tray 206 with a bread or flour crumb particulate mixture. Then the flexible grate cover section 266 is detached from a rigid section of grate 212 to permit the food to be breaded to be placed upon the food carrier 212 and then is locked in place by re-attaching the grate section 266 over grate 212. The knob 209 is rotated in a horizontal direction 217, to place food carrier 211 squarely over food tray 205. Then knob 209 is pressed downwards, in the direction 218, to dip the food carrier 211 into the egg mixture. The grate 212 may be rotated in the vertical plane by means of pinion 246 engaging rack 272 of upper armature 225. Upper armature tube 225 (within mid armature tube 208) has a cutout, with gear rack 272 on one side. This engages pinion gear 246, which is rigidly attached to the axle 244 of food support carrier 212. Then as knob 210 is moved up or down relative to knob 209, it is understood that pinion 246 will rotate, thereby causing food carrier 212 to flip over.

Both trays 205 and 206 may optionally have slots with self-sealing flexible lip seals (not shown) at the center of their proximal vertical sides to permit the grate pivot shaft 244 to travel down beyond the edge of the trays 205 and 206, without spilling contents.

Upon release of the knob 209, food carrier 211 rises by a force, such as a spring force of spring 228. Then the small knob 210 is pressed or pulled up in directions 218 a short distance until food carrier 211 is flipped over 180 degrees.

Subsequently, knob 209 is pressed again to dunk the opposite side in the egg mixture. Upon release, knob 209 is rotated either clockwise or counterclockwise until food carrier 212 is now moved horizontally over crumb tray 206. Then, the dunking and flipping motions as in the egg tray situation are repeated to coat both sides with crumbs. Thereafter, the semi-spherical door 203 is slid open to retrieve the breaded food items. Access to egg tray 205 is achieved by sliding door 204 open.

Figure 7:
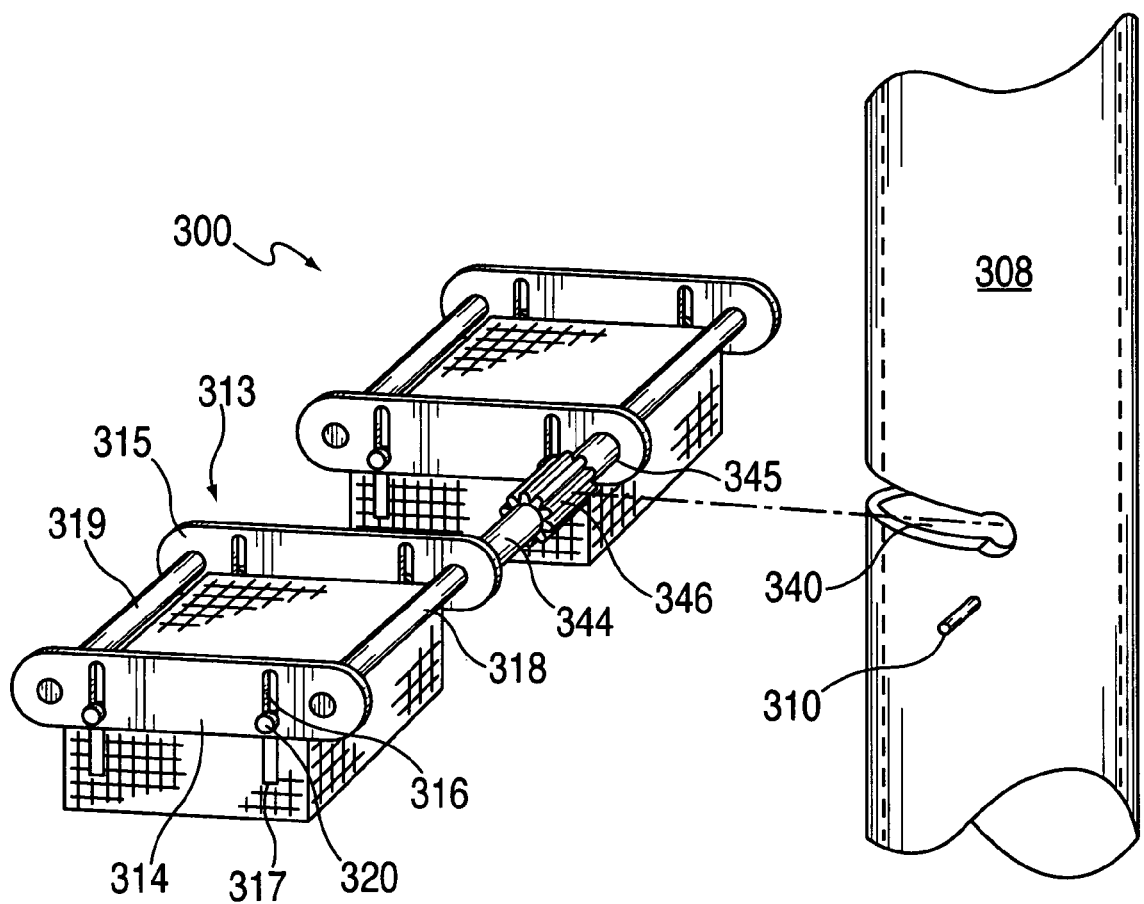
FIG. 7 is a detail exploded view of a component of the current invention, according to the embodiment in FIG. 5.

FIG. 7 shows an alternate embodiment for the operation of food carrier 300, wherein rigid food carrier grate 313 is pivotally attached to the armature 308 such that it is able to be rotated or "flipped". Carrier 300 has a pair of removable flexible grate sections 317. Armature 308 preferably has a cutout 340, for entry of pinion 346 of food carrier 300 therein, to engage a gear rack (not shown) within armature 308.

Slit 340 extends horizontally from the side of the tube 308 to a point past the center point of the tube 308. The slit 340 is tapered, forming a lock-in section for receipt of an axle 344 supporting food grate 212. Two stops 310 may extend horizontally and opposing from two points on the armature tube 308 below slit 340. The stops 310 act to prevent free rotation. Rigid food carrier support 313 may be removably attached to armature tube 308 by insertion of the axle 344 into the slit 340 such that the food carrier support 313 is locked in place as to prevent lateral movement, but free to rotate, thus in rotational communication with tube 308.

FIG. 7 also shows axle 344 comprising a pinion 346, rigidly attached to shaft 345. The pinion 346 of axle 344 is also in communication with a rack, such as rack 272 of FIG. 6, to permit rotation of food grate 313. Food is placed within carrier grate 313.

Axle 344 is connected to supports 318 of grates 313, which are opposite outer supports 319, connected by side walls 314 to supports 318. The side walls 314 and 315 of the food carrier 313 also have a first set of vertical slits 316 which align with the second set of vertical slits 317 of the food carrier support 313. A pin 320 is inserted through both sets of slits, thereby movably connecting food carrier 313 to supports 318 and 319. In this fashion, the food carrier is capable of sliding vertically relative to the supports 318,319 under the force of gravity. In so, the food carrier is biased to submerge into either the fluid tray or the particulate tray as opposed to remaining in a fixed position (relative to the supports) inhibiting the ability for the tray 300 to undergo a dipping process resulting in an effective coating of food matter. This pin and slit mechanism may also be incorporated into the food carrier embodiment of FIG. 1 or FIG. 5 without the loss of design characteristics previously mentioned or the addition of characteristics not mentioned. For example the supports 314, 315 as shown in FIG. 7 may easily be reconstructed to fit the perimeter of the semi-circular food carrier 212 of FIG. 6. The axle 244 would then be in rigid connection with the supports in place of the food carrier 212 directly. The food carrier 212 would alternatively be in movable communication with the support system of the pin and slit mechanism mentioned herein.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A breading machine for coating a food product with a mixture of food particulate and a food liquid comprising:

a pair of trays mounted side by side, one of said trays containing food liquid and one of said trays containing food particulate;

a slidable and rotatable vertical member passing between said trays, said member being slidable between a resting position and a lowered position;

a grate extending from and mounted on one side of said member, said grate being located in the resting position of said member above said trays;

means for rotating axially said member between a first position where said grate is above one of said trays and a second position where said grate is above a second of said trays;

means on said grate to support solid food product to be breaded with a mixture of said food liquid and said food particulate;

means for depressing and retracting said member causing said grate with a solid food product mounted thereon to dip said solid food product into one of said trays for being coated with said food liquid or food particulate, said member being rotatable to place said grate above the other of said trays allowing said grate to be lowered into the other of said trays for coating the food product with the other food liquid or food particulate; and means to rotate said grate 180 degrees to allow another side of said food product to be coated in turn by said food liquid and said food particulate.

2. The breading machine of claim 1 in which said means to rotate said grate 180 degrees is a second member attached to said member and is connected by a shaft to said grate, the rotation of said shaft by said second member causing rotation of said grate.

3. A breading machine for coating a food product with a mixture of food particulate and a food liquid comprising:

a hollow base having an open top;

a removable, transparent dome covering the open top of said base;

a pair of trays mounted side by side in said base, one of said trays containing food liquid and one of said trays containing food particulate;

a slidable and rotatable outer tube within said base extending vertically upward passing between said trays and out through an opening in said dome, said outer tube being slidable between a resting position and a lowered position;

a grate extending from and mounted on one side of said outer tube within said dome, said grate being located in the resting position of said outer tube above said trays;

means for rotating axially said outer tube between a first position where said grate is above one of said trays and a second position where said grate is above a second of said trays;

means on said grate to support a solid food product to be breaded with a mixture of said food liquid and said food particulate;

means for depressing and retracting said outer tube causing said grate with solid food product mounted thereon to dip said solid food product into one of said trays for being coated with said food liquid or food particulate, said outer tube being rotated to place said grate above the other of said trays allowing said grate to be lowered into the other of said trays for coating the food product with the other food liquid or food particulate; and means movable within said outer tube to rotate said grate 180 degrees to allow another side of said food product to be coated in turn by said food liquid and said food particulate.

4. The breading machine of claim 3 in which said means movable within said outer tube to rotate said grate comprises an elongated slot in said outer tube, with an edge of said slot being formed into a gear rack, an inner tube slidable within said outer tube, said inner tube having a shaft extending out through said slot of said outer tube, an end of said shaft outside of said outer tube being attached to said grate and an end of said shaft within said outer tube having a pinion engaged with said gear rack so that sliding of said inner tube within said outer tube causes said shaft and grate to rotate 180 degrees.

* * * * *